United States Patent
Takatsu

(10) Patent No.: US 6,430,319 B1
(45) Date of Patent: Aug. 6, 2002

(54) DATA CONVERSION PROCESSING CIRCUIT

(75) Inventor: Motomu Takatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/037,884

(22) Filed: Mar. 10, 1998

(30) Foreign Application Priority Data

Apr. 30, 1997 (JP) ............................................. 9-112711

(51) Int. Cl.⁷ ................................................. G06K 9/36
(52) U.S. Cl. ....................... 382/281; 382/282; 708/202; 708/400
(58) Field of Search ................................. 382/276, 291, 382/277, 199, 293, 281, 282; 708/202, 400

(56) References Cited

U.S. PATENT DOCUMENTS

| | | | | |
|---|---|---|---|---|
| 4,868,752 A | * | 9/1989 | Fujii et al. | 364/424.02 |
| 5,070,465 A | * | 12/1991 | Kato et al. | 395/141 |
| 5,341,437 A | * | 8/1994 | Nakayama | 382/1 |
| 5,379,353 A | * | 1/1995 | Hasegawa et al. | 382/104 |
| 5,616,905 A | * | 4/1997 | Sugiyama | 235/456 |
| 5,790,403 A | * | 8/1998 | Nkayama | 364/424 |
| 5,859,934 A | * | 1/1999 | Green | 382/296 |

* cited by examiner

Primary Examiner—Bhavesh Mehta
Assistant Examiner—Yosef Kassa
(74) Attorney, Agent, or Firm—Staas & Halsey

(57) ABSTRACT

A data conversion processing circuit which effects processing for data conversion which projects two-dimensional data on a plurality of straight lines with different inclinations. The data conversion processing circuit includes a circuit unit for storing two-dimensional data, a circuit unit for producing x and y coordinate locating data, which serves as an addend, according to an angle $\theta$ and generating a signal for use in selecting data, a circuit unit for selecting data, which serves as an addend, from among stored data in response to the control signal, and a circuit unit for adding selected data. For producing coordinates and selecting data, the data conversion processing circuit carries out arithmetic operations for a Hough transform expressed as $AH(\rho, \theta) = \int a(\rho \cdot \cos\theta - t \cdot \sin\theta, \rho \cdot \sin\theta + t \cdot \cos\theta)dt$. For handling different angles $\theta$, the arithmetic operations are carried out in a time-division manner. Owing to the configuration, a Hough transform can be achieved by performing a small number of arithmetic operations. This contributes to an increase in the processing speed.

9 Claims, 6 Drawing Sheets

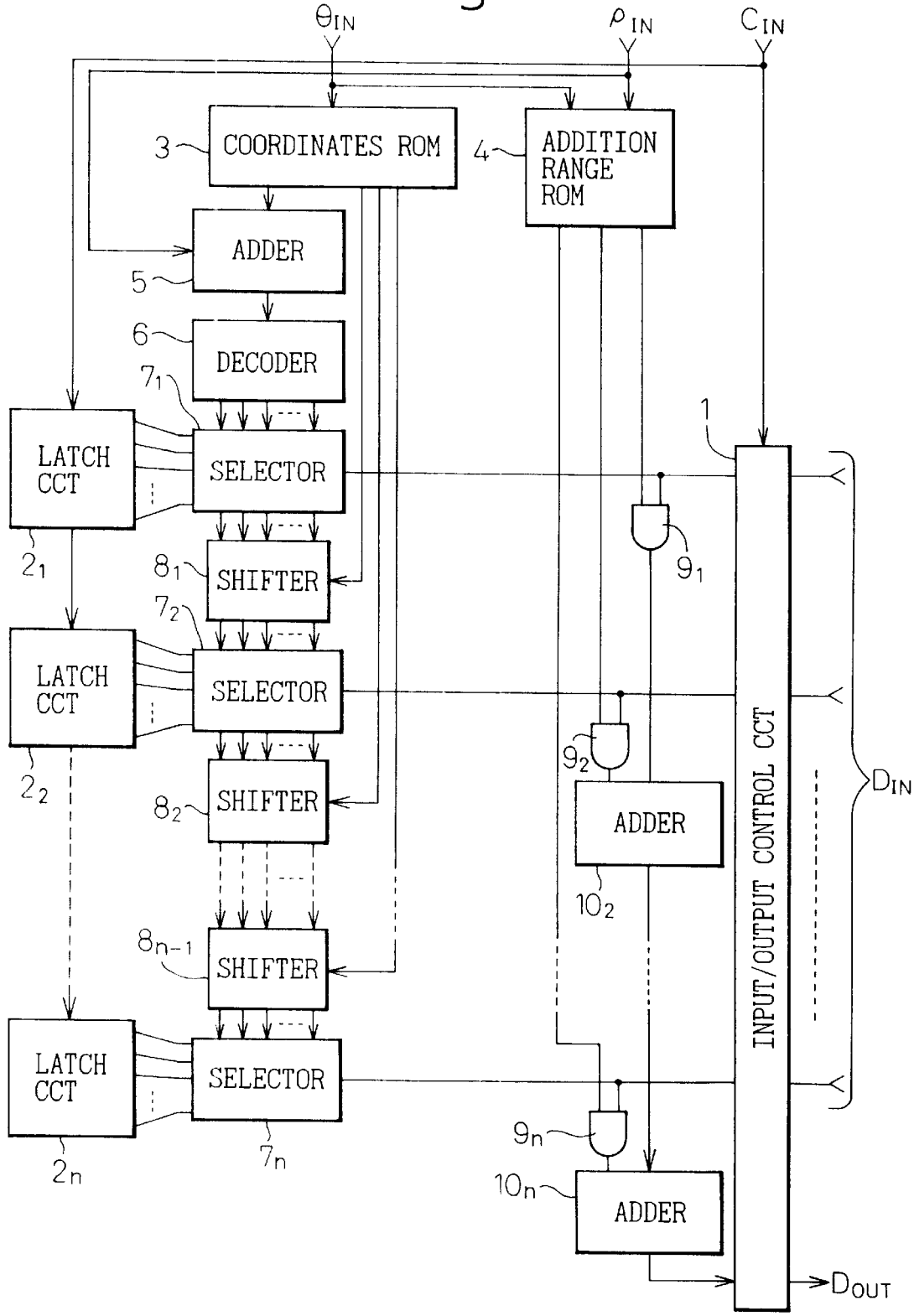

DATA CONVERSION PROCESSING CIRCUIT

BACKGROUND OF THE INVENTION

1. Field of the Invention

The present invention relates to a technique of effecting conversion processing of two-dimensional data. More particularly, it relates to a data conversion processing circuit which, using the Hough transform, effects processing for data conversion which projects two-dimensional data on a plurality of straight lines with different inclinations.

2. Description of the Related Art

The Hough transform is a technique for extracting a figure such as a straight line and circle from an image, and is effective in detecting a straight line as described later. Moreover, when the Hough transform is used to carry out pattern matching, the number of arithmetic operations can be reduced. From this viewpoint, the Hough transform is thought to be applicable to motion detection of an animated image or graphic recognition. The Hough transform is actually adopted as a pre-process for processing visual information, and is thought to help to reduce the number of subsequent arithmetic operations or to help to facilitate learning processes in a neural network. Accordingly, if the Hough transform can be easily carried out, information processing that requires a large number of arithmetic operations according to the existing methods, such as compression of moving image data and graphic recognition, can be achieved relatively easily. In view of this, there is an increasing demand for an art of carrying out the Hough transform with the number of arithmetic operations being as small as possible.

To begin with, the Hough transform will be described briefly with reference to FIGS. 1a and 1b. As shown in FIG. 1a, assuming that an angle, formed by a perpendicular extending from an origin to a straight line L in the system of x and y coordinates and the x axis, is θ, and the length of the perpendicular is ρ, the straight line L is expressed as x·cos θ+y·sin θ=ρ. When the line L passes through a point (u, V), an equality of u·cos θ+v·sin θ=ρ is established. When a trajectory (θ, ρ) where the angle θ and length ρ satisfy the equality is drawn in a ρ-θ space, a sine curve shown in FIG. 1b is produced. Likewise, when a trajectory (sine curve) linking points (u', v') is drawn, a point of intersection between the two trajectories shall be a point (θ$_0$, ρ$_0$) In this case, x·cos θ$_0$+y·sin θ$_0$=ρ$_0$ expresses a straight line passing through two points (u, v) and (u', v').

Based on the foregoing principle, a trajectory linking N points in an image is drawn in the ρ-θ space, and the cross point of the trajectory is obtained in order to define a straight line fitted to the set of points in the image. This processing is referred to as the Hough transform. For obtaining the cross point, after the elements of an array expressing the ρ-θ space are each initialized to 0, every time the trajectory (sine curve) passes through an element, a value of image data is added to the element. Finally, elements having large values are extracted. Thus, when the Hough transform is employed, a graphic of a straight line can be extracted from (that is, detected in) an image.

Assuming that image data at any point (x, y) in the original system of x and y coordinates is a(x, y), the Hough transform AH(ρ, θ) of the image data is expressed as follows:

$$AH(\rho, \theta) = \iint a(x, y) \cdot \delta(\rho - x \cdot \cos \theta - y \cdot \sin \theta) dx dy \quad (1)$$

This expression means that a value a(x, y) is added to the sine curve expressed as ρ=x·cos θ+y·sin θ in the ρ-θ space.

A normally adopted method is such that according to the expression (1), the length ρ (=x·cos θ+y·sin θ) is calculated with the x and y coordinates fixed and with the angle θ varied. In the prior art, calculations of cos θ and sin θ are needed, and thus the number of arithmetic operations becomes increased.

The foregoing method based on the expression (1) requires a considerable number of arithmetic operations for calculating x and y coordinates of data to be added to each other. However, an essential arithmetic operation with respect to the Hough transform is addition of data a(x, y), indicated by the expression (1). The calculation of x and y coordinates is not a principal part of the Hough transform. The number of arithmetic operations required for the calculation of x and y coordinates can be further reduced by efficiently selecting data serving as an addend.

However, no known art has provided a means capable of efficiently specifying x and y coordinates that locate data serving as an addend. This poses a problem that operations needed for projecting two-dimensional data on a plurality of straight lines having different inclinations, cannot be achieved at a high speed.

SUMMARY OF THE INVENTION

An object of the present invention is to provide a data conversion processing circuit capable of carrying out the Hough transform by performing a small number of arithmetic operations and eventually contributing to an increase in processing speed.

For accomplishing the object, according to the present invention, operations are carried out with an angle θ fixed so that x and y coordinates locating data serving as an addend can be produced efficiently. Moreover, for different angles θ, the operations are carried out in a time-division manner.

Specifically, when the aforesaid expression (1) is rewritten, the following expression is drawn out:

$$AH(\rho, \theta) = \int a(\rho \cdot \cos \theta - t \cdot \sin \theta, \rho \cdot \sin \theta + t \cdot \cos \theta) dt \quad (2)$$

This expression indicates that when the angle θ is fixed, addition should be carried out in the direction of t perpendicular to the direction of ρ. As seen from this expression, once coordinates (x, y) locating data serving as an addend, that is, (ρ·cos θ−t·sin θ, ρ·sin θ+t·cos θ) can be obtained efficiently, the Hough transform can be carried out efficiently.

According to the method based on the expression (1), the operations are carried out with the x and y coordinates fixed. Input data a(x, y) should therefore be fetched once. By contrast, according to the present invention, since the operations are carried out with the angle θ fixed, the same input data a(x, y) is used many times at different time instants. For improving efficiency, the input data a(x, y) should be fetched into a storage area to which access can be achieved quickly. Among the fetched data items, x and y coordinates that locate data serving as an addend are produced according to the angle θ, and data serving actually as an addend is selected according to the coordinate data. The selected data are summed up. This results in a Hough transform expressed in the ρ-θ space.

For realizing the operations, a data conversion processing circuit in accordance with the present invention comprises a data storage unit in which data located by x and y coordinates is stored, a coordinate generation unit for sequentially producing x and y coordinates locating data that serves as an addend according to an angle θ relative to the x axis, and generating a selection signal used to select data located by the x and y coordinates, a data selection unit for selecting data, which serves as an addend, from among data items stored in the data storage unit, and an addition unit for adding the selected data. For producing coordinates and selecting data, the Hough transform given by the expression (2) is employed.

According to the present invention, in the data conversion processing circuit, a change in coordinates ($\rho \cdot \cos \theta - t \cdot \sin \theta$, $\rho \cdot \sin \theta + t \cdot \cos \theta$), which is used to select input data a(x, y), due to a change in element t is expressed as ($\Delta t \cdot \sin \theta$, $\Delta t \cdot \cos \theta$) and substantially independent of $\rho$ and t. Consequently, the number of operations needed for producing coordinates can be reduced drastically.

Moreover, since addition of selected data items can be carried out as a parallel operation, operations involved in data conversion can be carried out at a high speed. For example, when data Nx*Ny in the system of x and y coordinates (two-dimensional data defined by Nx pixels in the x direction and Ny pixels in the y direction) is converted into corresponding data N$\rho$*N$\theta$ in the $\rho$-$\theta$ space, about Nx or Ny operations can be carried out as a parallel operation using about Nx or Ny adders.

By contrast, according to the method based on the expression (1), for achieving about Nx or Ny operations as a parallel operation, a large number of arithmetic operations or data items stored in ROMs are needed for producing coordinates. The method is therefore disadvantageous.

Discrete coordinates are used in reality. Therefore, strictly speaking, a change in coordinates ($\rho \cdot \cos \theta - t \cdot \sin \theta$, $\rho \cdot \sin \theta + t \cdot \cos \theta$), which is used to select input data a(x, y), due to a change in element t is dependent on $\rho$ and t. However, as long as the discrete coordinates are determined properly, the change will be independent of $\rho$. This is, for example, achieved as described below.

When the angle $\theta$ relative to the x axis ranges from $-\pi/4$ to $\pi/4$, one data item is selected for each y coordinate as data serving as an addend. A change relative to the $\rho$ axis is compensated for by shifting data to be selected in the x direction. Moreover, when the angle $\theta$ ranges from $-\pi/2$ to $-\pi/4$ or from $\pi/4$ to $\pi/2$, one data item is selected for each x coordinate as data serving as an addend. A change relative to the $\rho$ axis is compensated for by shifting data to be selected in the y direction. This process provides the merit described below.

To begin with, since one data item is selected for each x coordinate or y coordinate as data serving as an addend, the range of data items to be selected is narrow. The circuitries of a coordinate generation unit and data selection unit are therefore simplified. Moreover, a change relative to the $\rho$ axis can be compensated for by merely shifting data to be selected in the x or y direction. The circuitry of the coordinate generation unit can be simplified. By utilizing the fact that an absolute value of a change in y or x coordinate is 0 or 1, the circuitry of the coordinate generation unit can further be simplified. Furthermore, each input data a(x, y) is used as an addend without being duplicated or missed. Data manipulation, to be performed as subsequent processing, can be carried out easily.

The method based on the expression (2) has the demerit that the effective value of $\rho$ or t varies depending on the value of the angle $\theta$. However, since this variation can be predicted, proper correction can be carried out after a Hough transform is completed. When an inverse Hough transform is carried out as described later, the variation is canceled due to the same dependency on the angle $\theta$. The correction is therefore unnecessary.

BRIEF DESCRIPTION OF THE DRAWINGS

Other objects and features of the present invention will be described hereinafter in detail by way of preferred embodiments with reference to the accompanying drawings, in which:

FIG. 2 is a block diagram showing the configuration of a Hough transform circuit as a data conversion processing circuit in accordance with the first embodiment of the present invention;

DESCRIPTION OF THE PREFERRED EMBODIMENTS

FIG. 2 shows the configuration of a Hough transform circuit as a data conversion processing circuit in accordance with the first embodiment of the present invention. Illustrated is an example of a configuration including data selectors.

For brevity's sake, the description will proceed on the assumption that an angle $\theta$ relative to the x axis ranges from $-\pi/4$ to $\pi/4$.

In FIG. 2, there is shown an input/output control circuit 1 for giving control so that input data $D_{IN}$ vary x and y coordinates can be fetched from outside, or an output that is a Hough transform is output data $D_{OUT}$ to outside. The input and output data are controlled with a control signal $C_{IN}$.

Moreover, there are shown latch circuits $2_1$ to $2_n$ for storing data which is input via the input/output control circuit 1 and located by x and y coordinates. The latches $2_1$ to $2_n$ constitute the aforesaid "data storage unit." In the latch circuits $2_1$ to $2_n$, coordinate data is stored in ascending or descending order of x coordinate in relation to each y coordinate. Storing or reading data in or from the latch circuits $2_1$ to $2_n$ is controlled with the control signal $C_{IN}$.

According to this embodiment, latch circuits are used as the data storage unit. The present invention is not limited to the latch circuits. Any circuits will do as long as they have the ability to store data. For example, registers using flip-flops or RAMs can be substituted for the latch circuits.

Moreover, there is shown a coordinates ROM 3 in which data indicating x and y coordinates locating data that serves as an addend are stored in advance. The coordinates ROM 3 produces x and y coordinates locating data that serves as an addend according to the angle $\theta$ relative to the x axis. Data stored in the coordinates ROM 3 is not coordinates themselves but should be compressed data. For improving efficiency, therefore, the coordinates ROM should be used in combination with some logic circuits.

There is shown an addition range ROM 4 for specifying a range of y coordinates locating data items, which actually serve as an addend, in relation to each pair of $\rho$ and $\theta$.

There are shown an adder 5 for adding output data (x and y coordinates) of the coordinates ROM 3 to $\rho$ coordinate data $\rho_{IN}$, and a decoder 6 for decoding output data of the adder 5 and outputting a selection signal.

The coordinates ROM 3, addition range ROM 4, adder 5, and decoder 6 constitute the aforesaid "coordinate generation unit."

Moreover, there are shown selectors $7_1$ to $7_n$ for selecting data, which serves as an addend, from among data (located by x and y coordinates) read from the associated latch circuits $2_1$ to $2_n$ according to a result of decoding (selection signal) provided by the decoder 6. The selectors $7_1$ to $7_n$ are formed, for example, as shown as an example in FIG. 3, with transistors $Q_1$ to $Q_n$ serving as transfer gates.

Figure 4:
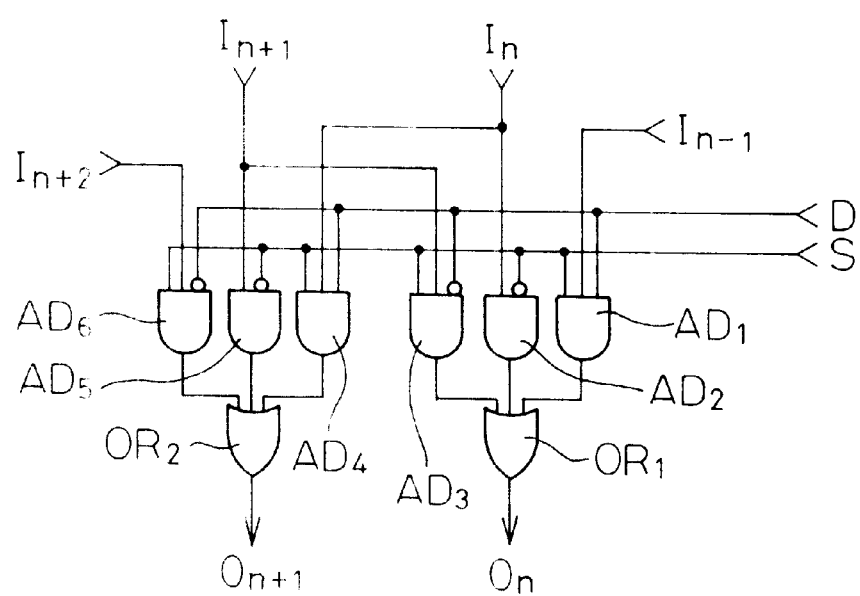
FIG. 4 is a circuit diagram showing an example of the circuitry of a shifter shown in FIG. 2.

Moreover, there are shown shifters $8_1$ to $8_{n-1}$ each shifting a plurality of bits constituting a selection signal input through a selector on the preceding stage on the basis of a shift control signal supplied from the coordinates ROM 3. The shifters $8_1$ to $8_{n-1}$ are, for example, as shown as an example in FIG. 4, each composed of six AND gates $AD_1$ to $AD_6$ and two OR gates $OR_1$ and $OR_2$. In FIG. 4, there are shown shift control signals D and S, selection signals In, In+1, etc. serving as input data, and selection signals On and On+1 serving as output data.

The selectors $7_1$ to $7_n$ and shifters $8_1$ to $8_{n-1}$ constitute the aforesaid "data selection unit."

Moreover, there are shown AND gates $9_1$ to $9_n$ for adding data selected and output by and from the associated selectors $7_1$ to $7_n$ to output data of the addition range ROM 4, and adders $10_2$ to $10_n$ on for adding outputs of AND gates $9_2$ to $9_n$ on the associated stage to outputs of the AND gates $9_1$ to $9_n$ on the preceding stage. For the adders $10_2$ to $10_n$, an ordinary adder may be employed. Especially when a carry-save type adder is employed, there arises the merit of minimizing an adverse effect derived from propagation of a carry.

The AND gates $9_1$ to $9_n$ and adders $10_2$ to $10_n$ constitute the aforesaid "addition unit."

The Hough transform circuit of this embodiment having the foregoing components carries out arithmetic operations as described below.

First, the coordinates ROM 3 produces an x coordinate specified by a $\rho$ coordinate of 0 and a y coordinate of a basis value $y_0$. The adder 5 adds a $\rho$ coordinate to the x coordinate, whereby an x coordinate for the y coordinate of the basis value $y_0$ is calculated in relation to an arbitrary $\rho$. A change in x coordinate (difference data) due to an increase in y coordinate is added sequentially to the x coordinate, whereby x coordinates for all y coordinates can be calculated. This processing may be carried out by an adder. However, since a change in x coordinate due to an increase in y coordinate is 0 or ±1, the processing described below is adopted in an effort to reduce an amount of stored data and the number of operations.

Specifically, difference data relative to each y coordinate is represented by one bit and stored in the coordinates ROM 3. The x coordinate for the y coordinate of the basis value $y_0$ is decoded by the decoder 6. Decoded data on a signal line is shifted by one bit in a direction dependent on difference data representing 0 or ±1 (See FIG. 4 showing the circuitry of a shifter). The number of an activated signal line indicates an x coordinate. The direction of shifting is determined by 1 when the angle $\theta$ ranges from $-\pi/4$ to 0, and by −1 when the angle $\theta$ ranges from 0 to $\pi/4$.

Figure 1A:
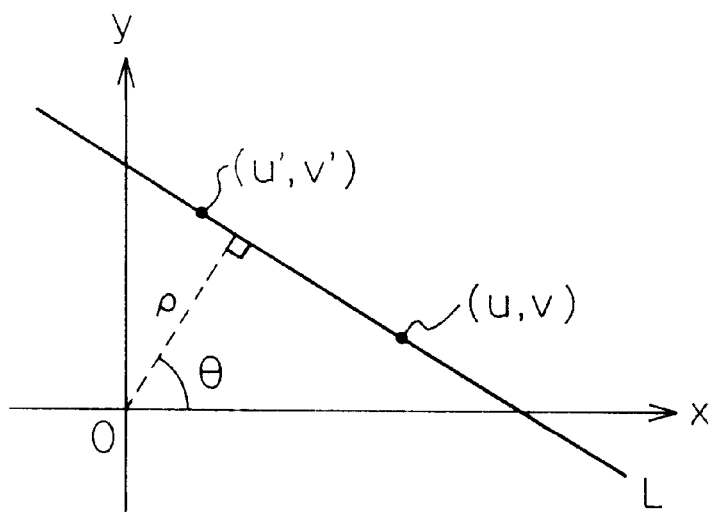
FIGS. 1a and 1b are explanatory diagrams concerning Hough transform.
Figure 1B:
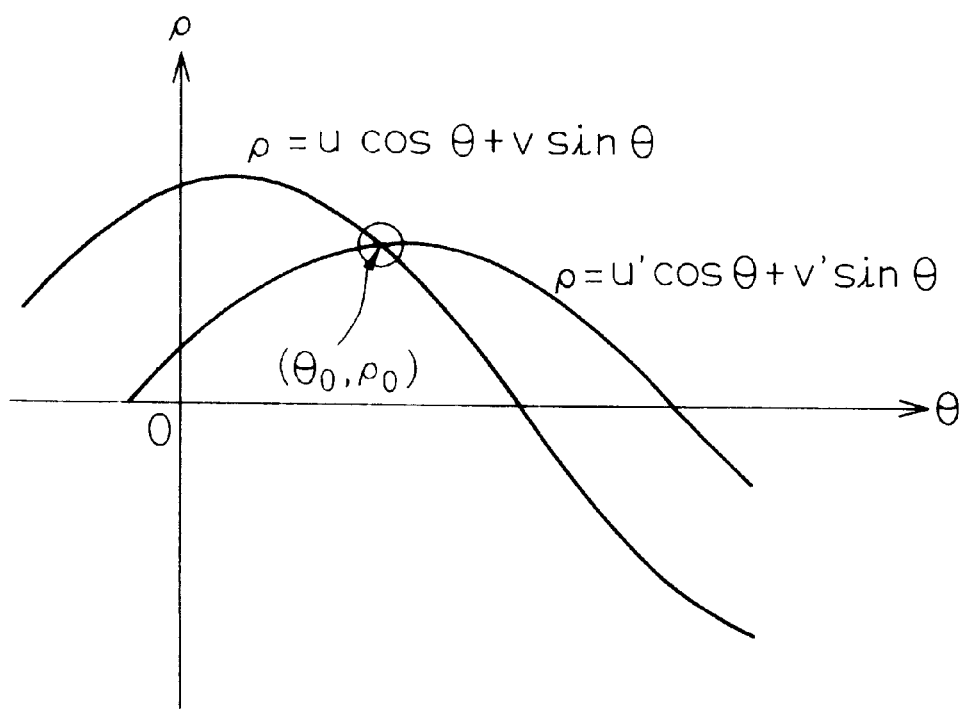
Figure 3:
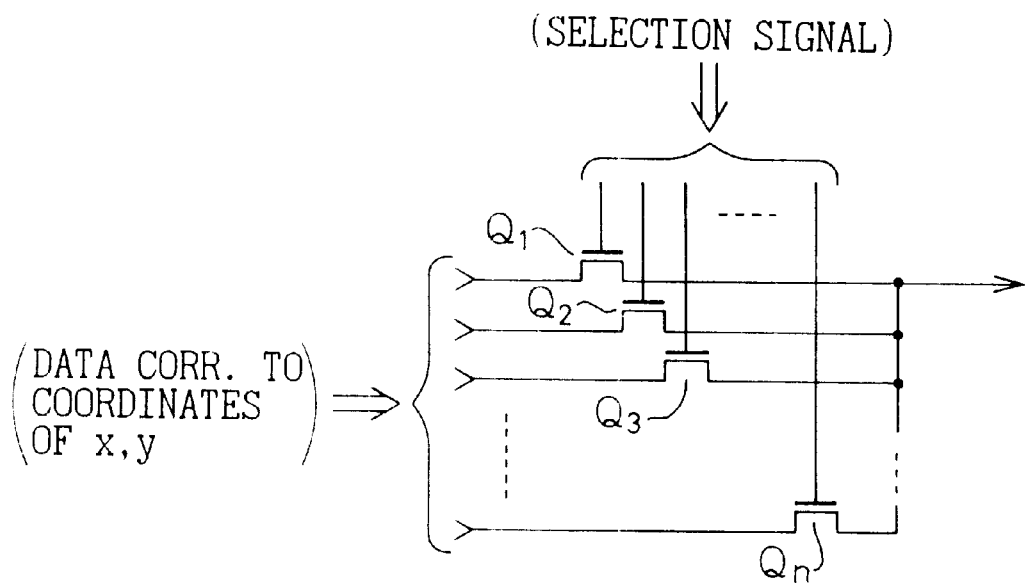
FIG. 3 is a circuit diagram showing an example of the circuitry of a selector shown in FIG. 2.

Thereafter, the selectors $7_1$ to $7_n$ each turn on or off an associated one of the transfer gate transistors $Q_1$ to $Q_n$ according to the decoded signal (selection signal) (See FIG. 3 showing the circuitry of a selector). One of data items located by the same y coordinate is thus selected for each y coordinate.

The addition unit (AND gates $9_1$ to $9_n$ and adders $10_2$ to $10_n$) adds data, which is recognized as valid data on the basis of an output of the addition range ROM 4, and outputs resultant data (outputs a Hough transform).

When the angle $\theta$ ranges from $-\pi/2$ to $-\pi/4$ or from $\pi/4$ to $\pi/2$, x and y coordinates are exchanged. Specifically, coordinate data is stored in the latch circuits $2_1$ to $2_n$, which constitute the "data storage unit," in ascending or descending order of y coordinate in relation to each x coordinate.

Another group of selectors may be included as a data selection unit. The group of selectors each select one data item from data items located by the same x coordinate. The two groups of selectors are switched according to the range of angles $\theta$.

Figure 5:
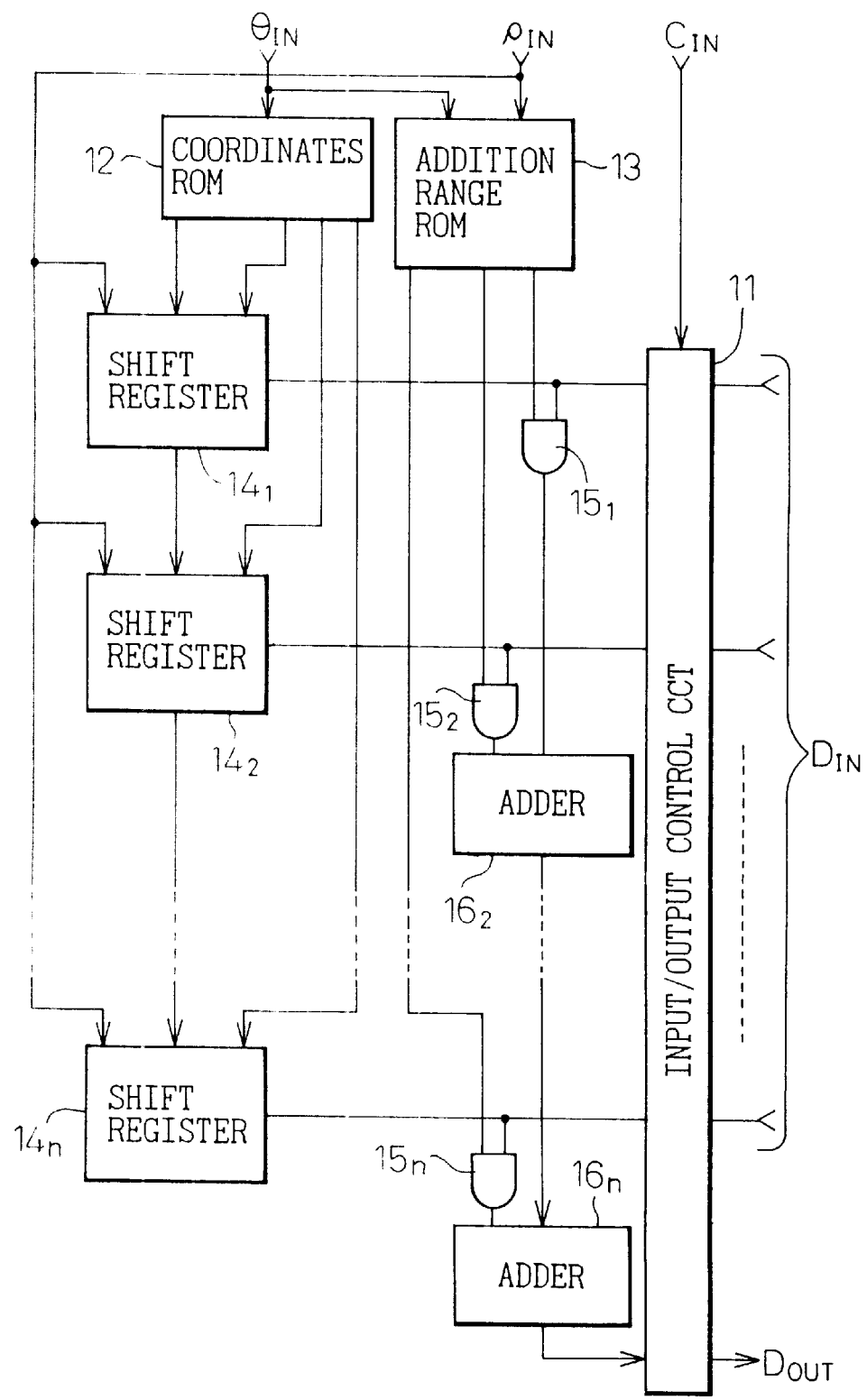
FIG. 5 is a block diagram showing the configuration of a Hough transform circuit as a data conversion processing circuit in accordance with the second embodiment of the present invention.

FIG. 5 shows the configuration of a Hough transform circuit as a data conversion processing circuit in accordance with the second embodiment of the present invention. Illustrated is an example of a configuration including shift registers.

The Hough transform circuit in accordance with this embodiment is characterized in that shift registers $14_1$ to $14_n$ replace the latch circuits $2_1$ to $2_n$, selectors $7_1$ to $7_n$, and shifters $8_1$ to $8_{n-1}$ employed in the aforesaid embodiment (See FIG. 2). The shift registers $14_1$ to $14_n$ have the capabilities of a data storage unit and a data selection unit.

The other circuit elements and their operations are substantially identical to those. in the embodiment described in conjunction with FIG. 2 except a point that a shift pulse to be applied to the shift registers $14_1$ to $14_n$ is produced instead of a coordinate signal to be produced on the basis of data read from the coordinates ROM. The description of the other circuit elements and their operations will therefore be omitted. However, when the angle $\theta$ is changed, consideration must be taken into the fact that data items in each shift register are arranged according to an original angle $\theta$.

According to the configuration of this embodiment, in addition to the merit provided by the first embodiment, the merit that a parallel operation can be carried out relative to a change in $\rho$ is available. As illustrated, when the shift registers $14_1$ to $14_n$ responding to $\rho$ coordinate data $\rho_{IN}$ shift all data items to be converted according to the length $\rho$, operations to be carried out for handling different angles $\theta$ can be achieved in a time-division manner.

Figure 6A:
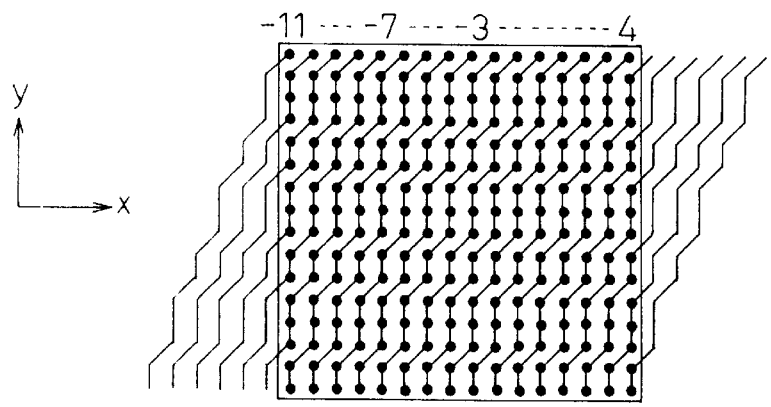
FIGS. 6a to 6c are explanatory diagram concerning a range of data items to be subjected to a Hough transform.
Figure 6B:
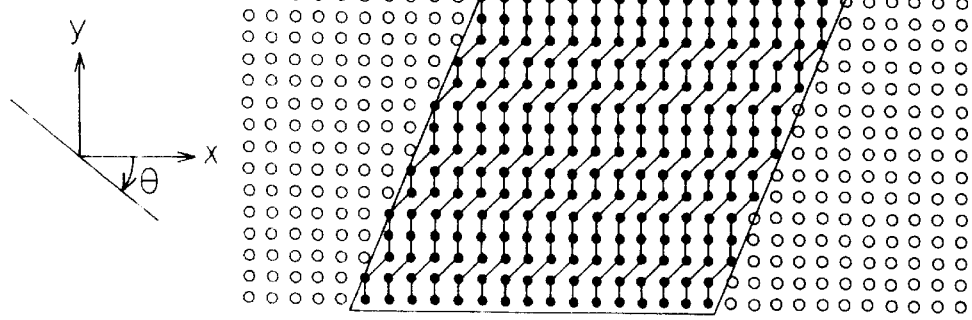
Figure 6C:
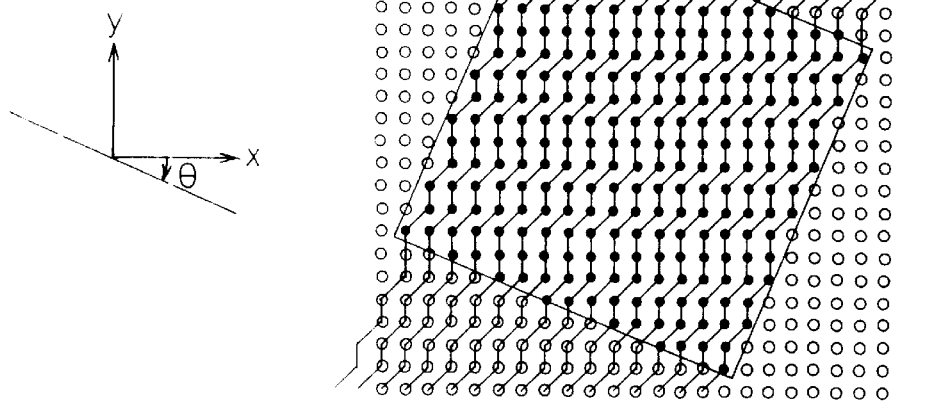

FIGS. 6a to 6c show a range of data items to be subjected to a Hough transform, that is, coordinates locating the data items to be added by the Hough transform circuit of each embodiment.

FIGS. 6a, 6b, and 6c show coordinates locating data items in a square area, coordinates locating data items in a parallelogrammic area dependent on the angle $\theta$, and coordinates locating data items in a rectangular area dependent on the angle $\theta$ as ranges of data items to be subjected to Hough transform.

First, in the case of the square area (See FIG. 6a), the scale of the Hough transform circuit can be minimized, areas can be integrated, and each data can be used at the same frequency. However, a range of required $\rho$ gets larger, and the number of data items serving as an addend varied depending on the $\rho$. In the illustrated example, the number of data items located by the $\rho$ coordinate of −7 (indicated with black dots) and serving as an addend is 11, while the number of data items located by the $\rho$ coordinate of −3 and serving as an addend is 16. Besides, the differentiation to be performed for detecting a straight line is difficult to do.

Secondly, in the case of the parallelogrammic area dependent on the angle θ (See FIG. 6b), the number of data items serving as an addend is always constant (in the illustrated example, the number of data items serving as an addend is 16 irrespective of the ρ coordinate). Moreover, there is the merit that the differentiation is easy to do and that areas can be integrated relatively easily. However, an area in which data is stored gets larger. The use frequency of original data varies depending on a location indicated by coordinates.

Finally, in the case of the rectangular area dependent on the angle θ (See FIG. 6c), a shape seen in the direction of projection hardly depends on the angle θ. There is the merit that the characteristic of the Hough transform concerning detection of straight lines hardly depends on the angle θ. However, a range of lengths ρ, the number of additions, and the upper and lower limits of the x (or y) coordinate vary depending on the angle θ. A large area is therefore required for storing data, and operations for defining a range of data items serving as an addend is needed. Beside, it is difficult to integrate areas.

Among the foregoing methods, in the methods handling the square area and the parallelogrammic area dependent on the angle θ, data items located by all y (x) coordinates should be added to the element t. The aforesaid addition range ROM and the AND gates included in the addition unit become unnecessary. These methods have merits and demerits, and should therefore be used for different purposes.

Figure 7:
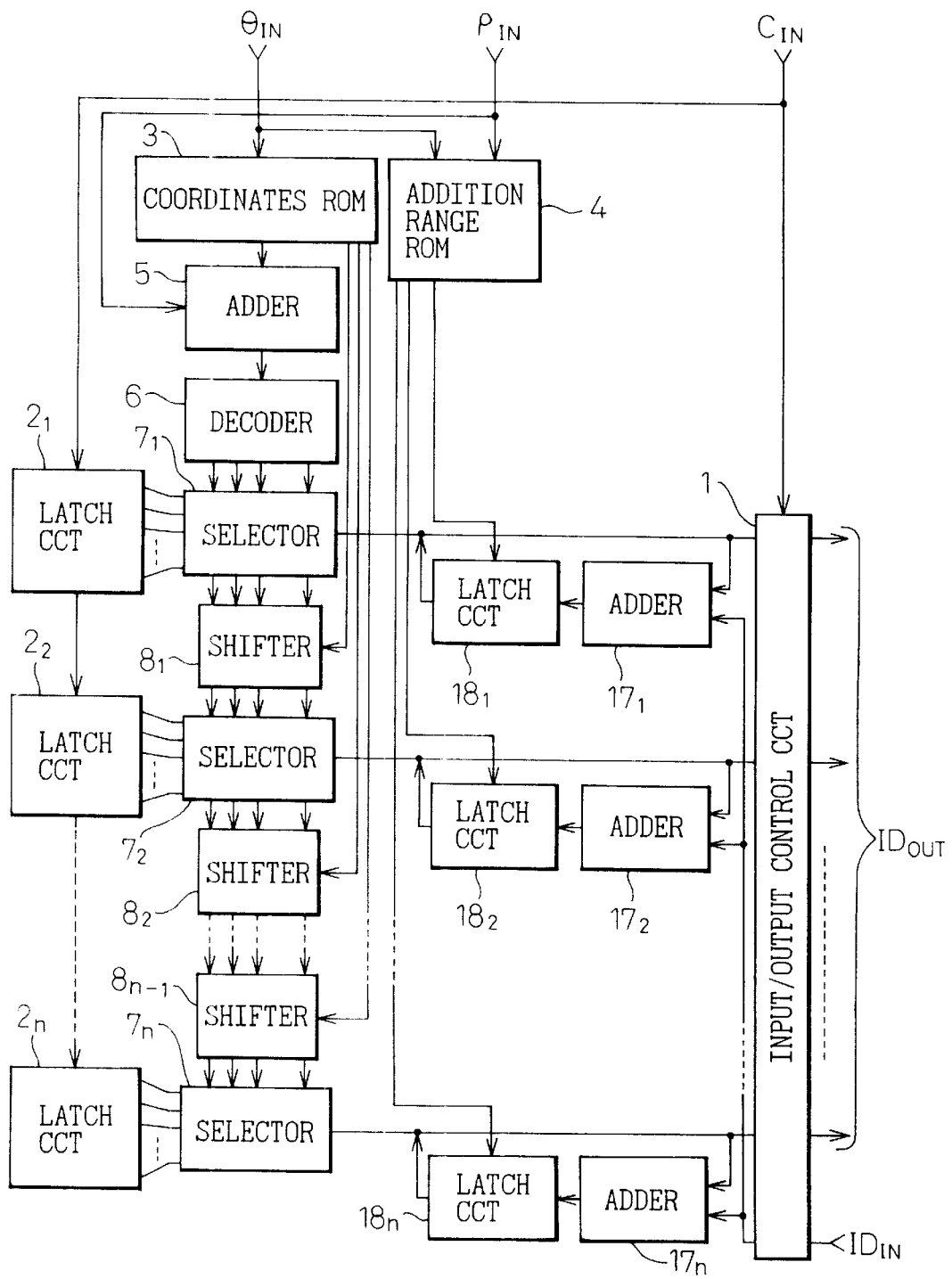
FIG. 7 is a block diagram showing the configuration of an inverse Hough transform circuit as a data conversion processing circuit in accordance with the third embodiment of the present invention.

In the aforesaid embodiments, arithmetic operations to be performed for achieving projection as part of a Hough transform have been described. For motion detection or the like, after matching with data in the ρ-θ space is completed, the data is converted into a displacement in the original system of x and y coordinates. Inverse Hough transform is therefore needed. FIG. 7 shows an example of the configuration of an inverse Hough transform circuit.

In FIG. 7, reference numerals identical to those employed in the configuration shown in FIG. 2 denote the same components. The description of the components will be omitted.

The inverse Hough transform circuit of this embodiment is characterized in that adders $17_1$ to $17_n$ for adding input data $ID_{IN}$ to data items. selected by the selectors $7_1$ and $7_n$ and latch circuits $18_1$ to $18_n$ for latching outputs of the associated adders $17_1$ to $17_n$ and placing the outputs on lines over which the selected data items are transferred are substituted for the AND gates $9_1$ to $9_n$ and adders $10_2$ to $10_n$.

Specifically, according to the configuration of this embodiment, data items added by the adders $17_1$ to $17_n$ are re-written in original storage areas in the data storage unit (latch circuits $2_1$ to $2_n$) via the latch circuits $18_1$ to $18_n$ and selectors $7_1$ to $7_n$. Thus, inverse projection analogous to an inverse Hough transform can be achieved.

What is claimed is:

1. A data conversion processing circuit which projects two-dimensional data on a plurality of straight lines with different inclinations, the data conversion processing circuit comprising:
   a coordinate generation unit generating x and y coordinates locating data according to a range of angles θ, and generating a selection signal;
   a data storage and selection unit storing two-dimensional data located by x and y coordinates and using the selection signal to select the data stored therein; and
   an addition unit adding the selected data to the data generated by said coordinate generation unit,
   wherein when generating coordinates and selecting data, arithmetic operations based on a Hough transform, are carried out, comprising:

$$AH(ρ, θ)=\int a(ρ·\cos θ-t·\sin θ, ρ\sin θ+t·\cos θ)dt,$$

wherein t denotes a coordinate in a direction perpendicular to the direction of the ρ coordinate; and when handling multiple angles, the Hough transform is carried out in a time-division manner.

2. The data conversion processing circuit as set forth in claim 1, wherein said data storage and selection unit comprises:
   a latch circuit storing two-dimensional data located by x and y coordinates; and
   a selector using the selection signal to select data stored in said data storage unit.

3. The data conversion processing circuit as set forth in claim 2, wherein, according to the range of angles θ, said data selection unit selects data located by x coordinate or selects data located by y coordinate.

4. The data conversion processing circuit as set forth in claim 3, wherein, according to the range of angles θ, said coordinate generation unit generates an x coordinate using difference data represented by one bit in relation to each y coordinate or generates a y coordinate using difference data represented by one bit in relation to each x coordinate.

5. The data conversion processing circuit as set forth in claim 1, wherein said data storage and selection unit comprises:
   a shift register storing two-dimensional data located by x and y coordinates and using the selection signal to select data stored therein.

6. The data conversion processing circuit as set forth in claim 5, wherein, based on the range of angles θ, said data selection unit selects data in the x coordinate or in the y coordinate.

7. The data conversion processing circuit as set forth in claim 6, wherein, based on the range of angles θ, said coordinate generation unit generates an x coordinate using difference data represented by one bit in relation to each y coordinate or produces a y coordinate using difference data represented by one bit in relation to each x coordinate.

8. A data conversion processing circuit which projects two-dimensional data on a plurality of straight lines with different inclinations, the data conversion processing circuit comprising:
   a coordinate generation unit generating x and y coordinates locating data according to a range of angles θ, and generating a selection signal;
   a latch circuit storing two-dimensional data located by x and y coordinates;
   a selector using the selection signal to select data stored in a data storage unit; and
   a circuit adding input data to the selected data, wherein the sum is stored in said latch circuit, and said data conversion processing circuit performs an inverse projection substantially corresponding to an inverse Hough transform.

9. A data conversion processing circuit which projects two-dimensional data on a plurality of straight lines with different inclinations, the data conversion processing circuit comprising:
   a coordinate generation unit generating x and y coordinates locating data according to a range of angles θ, and generating a selection signal;

shift register storing two-dimensional data located by x and y coordinates and using the selection signal to select data stored therein; and a circuit adding input data to the selected data, wherein the sum is stored in said shift register, and said data conversion processing circuit performs an inverse projection substantially corresponding to an inverse Hough transform.

* * * * *